United States Patent
Chang (10) Patent No.: US 11,758,378 B2
(45) Date of Patent: Sep. 12, 2023

(54) VEHICLE HYBRID COMMUNICATION SYSTEM AND COMMUNICATION METHOD THEREOF

(71) Applicant: AUTOMOTIVE RESEARCH & TESTING CENTER, Changhua Hsien (TW)

(72) Inventor: Wei-Hsuan Chang, Changhua Hsien (TW)

(73) Assignee: AUTOMOTIVE RESEARCH & TESTING CENTER, Changhua Hsien (TW)

(*) Notice: Subject to any disclaimer, the term of this patent is extended or adjusted under 35 U.S.C. 154(b) by 171 days.

(21) Appl. No.: 17/523,452

(22) Filed: Nov. 10, 2021

(65) Prior Publication Data

US 2023/0143167 A1    May 11, 2023

(51) Int. Cl.
| | |
|---|---|
| *G08G 1/0965* | (2006.01) |
| *H04W 4/46* | (2018.01) |
| *H04W 74/08* | (2009.01) |
| *H04W 84/18* | (2009.01) |
| *H04W 74/00* | (2009.01) |

(52) U.S. Cl.
CPC ........... *H04W 4/46* (2018.02); *H04W 74/002* (2013.01); *H04W 74/0866* (2013.01); *H04W 84/18* (2013.01)

(58) Field of Classification Search
USPC ....... 340/902, 903, 904, 917, 924, 936, 969, 340/970, 991–994, 995.13, 435, 466, 340/539.22, 691.3, 691.8
See application file for complete search history.

(56) References Cited

U.S. PATENT DOCUMENTS

| | | | | |
|---|---|---|---|---|
| 2006/0291473 | A1* | 12/2006 | Chase | H04L 45/50 370/395.5 |
| 2010/0235285 | A1* | 9/2010 | Hoffberg | G06Q 50/188 705/37 |
| 2018/0082392 | A1* | 3/2018 | Miller | G06Q 50/2053 |
| 2022/0172614 | A1* | 6/2022 | Beaurepaire | G08G 1/0969 |

* cited by examiner

Primary Examiner — Daniel Previl
(74) Attorney, Agent, or Firm — Birch, Stewart, Kolasch & Birch, LLP (57) ABSTRACT

A vehicle hybrid communication system includes a vehicle communication device and a field communication device. The vehicle communication device includes a vehicle controller and multiple vehicle communication interfaces. The field communication device includes a field controller and multiple field communication interfaces. The vehicle communication device and the field communication device communicate via multiple communication channels established by the vehicle communication interfaces and the field communication interfaces. The vehicle controller respectively defines a bandwidth level and a speed level based on a real-time bandwidth and a real-time connection speed of each of the communication channels. The vehicle controller then creates a score based on the bandwidth level and the speed level of each of the communication channels. The vehicle controller then sets one of the communication channels with the best score as a main communication channel to transfer data to the field communication device.

23 Claims, 7 Drawing Sheets

VEHICLE HYBRID COMMUNICATION SYSTEM AND COMMUNICATION METHOD THEREOF

BACKGROUND OF THE INVENTION

1. Field of the Invention

The present invention relates to a communication system and a communication method thereof, in particular a vehicle hybrid communication system and a communication method thereof.

2. Description of the Related Art

An automated vehicle is usually remotely connected to a back-end information station, wherein both the automated vehicle and the back-end information station transfer data bi-directionally. The automated vehicle would transfer real-time data relating to GPS coordinates, throttle openness, break signals, vehicle camera feeds, traffic situations, and/or vehicle speed to the back-end information station. The back-end information station would then be able to monitor and comprehend real-time situations relating to the automated vehicle. The back-end information station would also be able to transfer data and control commands to the automated vehicle, allowing the automated vehicle to drive automatically based on the data and control commands provided.

Naturally, the data transferred between the automated vehicle and the back-end information station is of great abundance and importance, as the data closely relates to safety of the vehicle. It is therefore very important to ensure good communication quality between the automated vehicle and the back-end information station. When communication quality decreases between the automated vehicle and the back-end information station, or when the automated vehicle disconnects from the back-end information station, the automated vehicle can no longer receive crucial real-time data and control commands from the back-end information station, and without the back-end information station properly updated about the automated vehicle's real-time situation, the automated vehicle has increased chances of having a traffic accident.

SUMMARY OF THE INVENTION

Regarding the above drawbacks, the present invention provides a vehicle hybrid communication system and a communication method thereof. The present invention ensures good communication quality as the vehicle connects externally and remotely, improving upon drawbacks about communication quality mentioned in prior arts.

A vehicle hybrid communication system includes:
a vehicle communication device, mounted in a vehicle, including a vehicle controller and multiple vehicle communication interfaces; wherein the vehicle communication interfaces are electrically connected to the vehicle controller; and
a field communication device, mounted on a roadside, including a field controller and multiple field communication interfaces; wherein the field communication interfaces are electrically connected to the field controller; wherein multiple communication channels are established between at least two of the field communication interfaces and at least two of the vehicle communication interfaces, allowing a network packet to be transferred between the vehicle communication device and the field communication device via the communication channels;
wherein, the vehicle controller respectively defines a bandwidth level and a speed level based on a real-time bandwidth and a real-time connection speed of each of the communication channels; wherein the vehicle controller then creates a score based on the bandwidth level and the speed level of each of the communication channels, and then the vehicle controller sets one of the communication channels with the best score as a main communication channel; wherein via the main communication channel, the vehicle controller transfers data to the field communication device.

A vehicle hybrid communication method is executed by a vehicle controller and includes steps of:
establishing multiple communication channels with a field communication controller;
defining a bandwidth level and a speed level based on a real-time bandwidth and a real-time connection speed of each of the communication channels;
creating a score based on the bandwidth level and the speed level of each of the communication channels; and
setting one of the communication channels with the best score as a main communication channel; wherein via the main communication channel, the vehicle controller transfers data to the field communication device.

The vehicle hybrid communication system and communication method of the present invention allow the field communication device to be connected to a back-end information station. The field communication device allows bi-directional data transfers between the vehicle communication device and the back-end information station. Multiple communication channels are established between the vehicle controller and the field controller, and among the communication channels, one communication channel with the best score is set to be the main communication channel. Even given a time when the main communication channel suffers disconnection or bad communication quality, the present invention is able to reset one of the other communication channels with the best score as the main communication channel. This way the present invention ensures best connection between the vehicle communication device and the field communication device in any given time, thus improving communication quality issues mentioned in prior arts.

DETAILED DESCRIPTION OF THE INVENTION

Figure 1:
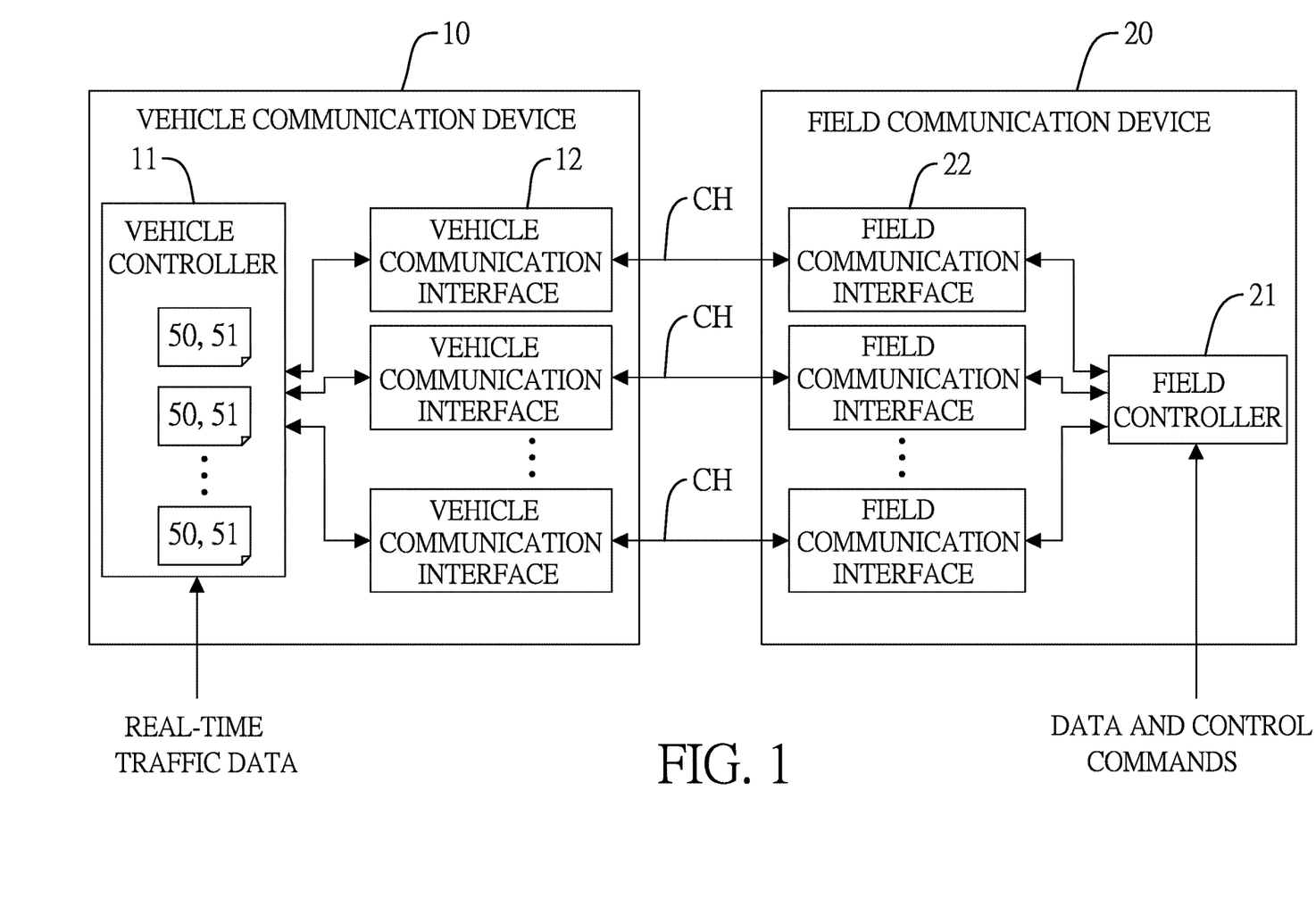
FIG. 1 is a block diagram of an embodiment of a vehicle hybrid communication system of the present invention.
Figure 2:
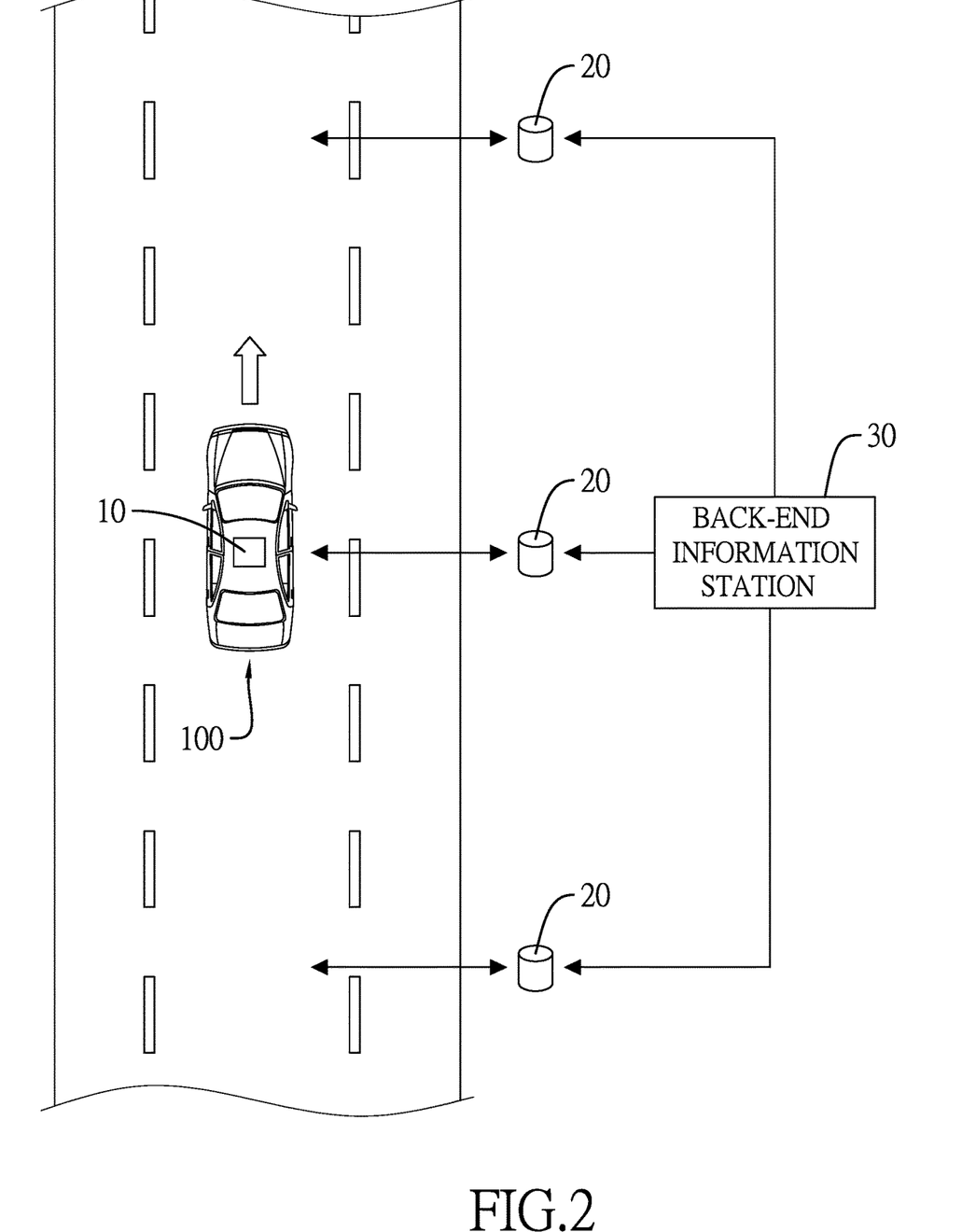
FIG. 2 is a schematic diagram of connection between the vehicle hybrid communication system of the present invention and a back-end information station.

With reference to FIG. 1, an embodiment of a vehicle hybrid communication system of the present invention includes a vehicle communication device 10 and a field communication device 20. The vehicle communication device 10 is mounted in a vehicle 100. The vehicle 100 may be an automated vehicle or a vehicle in a group of automated vehicles. The field communication device 20 is mounted on a roadside, wherein the vehicle drives on the road and passes the side of the road installed with the field communication device 20. The field communication device 20 is free to be installed indoors or outdoors. In FIG. 2, multiple field communication devices 20 are installed along the roadside. In this case, as long as the vehicle communication device 10 of the vehicle 100 enters within communication range of either of the field communication devices 20, the vehicle communication device 10 and the field communication device 20 can connect and bi-directionally transfer data. Here FIG. 1 offers a block diagram for explaining a situation wherein the vehicle communication device 10 is connected with one of the field communication devices 20.

For example, the field communication device 20 connects to a back-end information station 30. The vehicle communication device 10 receives a real-time traffic data through an On-Board Diagnostics-II (OBD-II) and a Controller Area Network (CAN Bus). The vehicle communication device 10 then sends the real-time traffic data to the field communication device 20. The real-time traffic data, for example, includes synchronized time with time of a control system of the vehicle 100, a vehicle coordinate (for example a GPS coordinate), a throttle openness, break signals, vehicle camera feeds, traffic situations, and/or vehicle speed. The back-end information station 30 is able to receive the real-time traffic data from the field communication device 20. In addition, the back-end information station 30 is also able to transmit data and control commands through the field communication device 20 to the vehicle communication device 10. When the vehicle 100 is automated, the vehicle 100 stays automated based on the data and the control commands received. The vehicle 100 stays automated by maintaining vehicle speed control (such as maintaining speed, accelerating, decelerating, and braking), route control (such as going straight, turning, overtaking, and pulling over), and formation changes of vehicle platoon etc. The vehicle 100 is free to stay automated elsewise by maintaining other aspects unmentioned in the example above.

It is very important to ensure good communication quality between the vehicle communication device 10 and the field communication device 20. When the communication quality is great, the real-time traffic data of the vehicle 100 can be factually provided to the back-end information station 30. The back-end information station 30 would be able to effectively monitor situations relating to the vehicle 100. The vehicle 100 also would be able to factually receive data and control commands from the back-end information station 30, for accordingly automating the vehicle 100.

Figure 3:
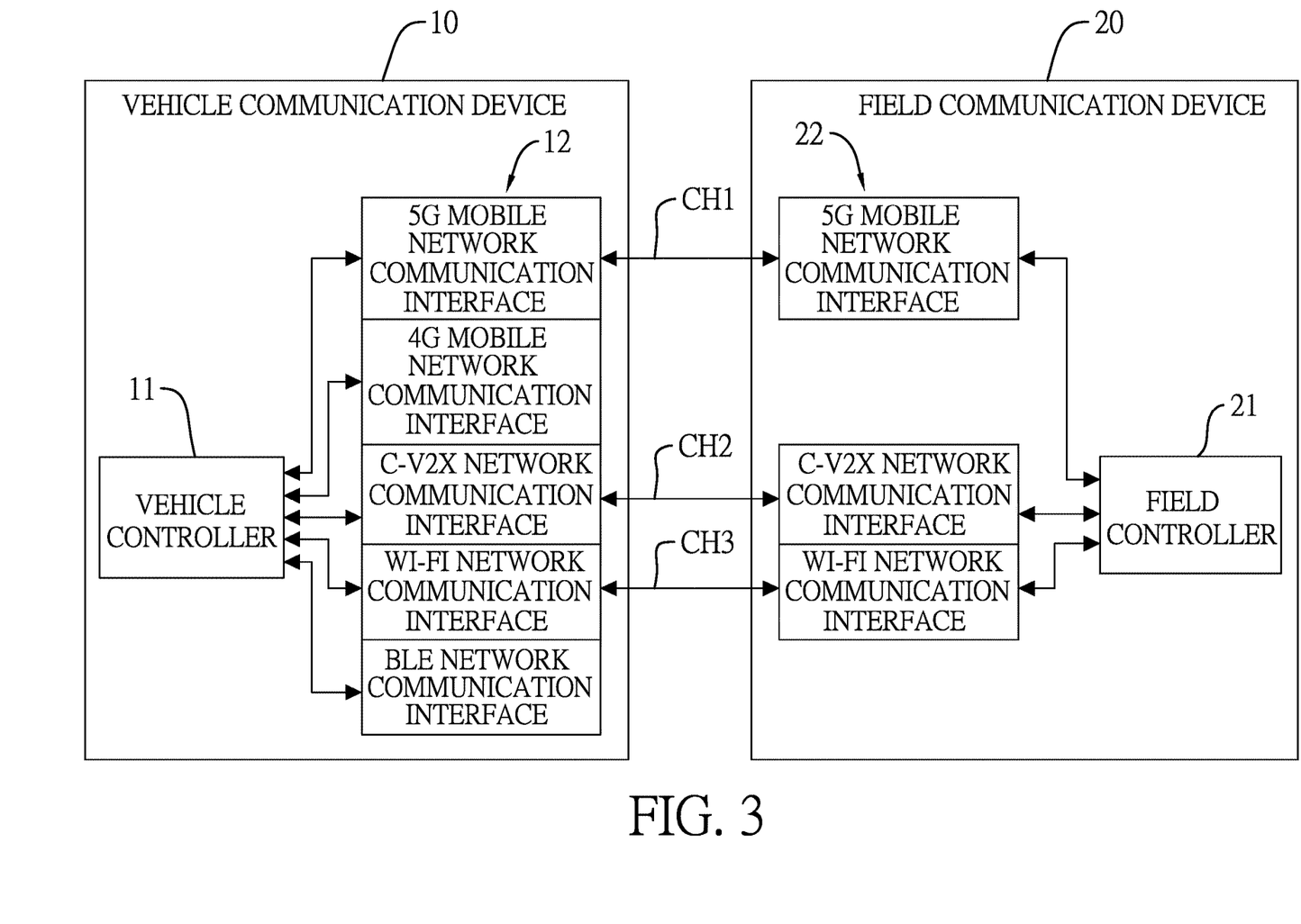
FIG. 3 is another block diagram of the embodiment of the vehicle hybrid communication system of the present invention.

In an embodiment of the present invention, the vehicle communication device 10 includes a vehicle controller 11 and multiple vehicle communication interfaces 12, wherein the vehicle communication interfaces 12 are electrically connected to the vehicle controller 11. The vehicle communication interfaces 12 differ individually in types (of different communication protocols). The vehicle controller 11 is a controller chip, and the vehicle communication interfaces 12 are wireless communication interfaces. Such wireless communication interfaces include mobile communication interfaces and short distance wireless communication interfaces. With reference to FIG. 3, for instance, the vehicle communication interfaces 12 includes a fifth generation (5G) mobile network communication interface, a fourth generation (4G) mobile network communication interface, a cellular vehicle-to-everything (C-V2X) network communication interface, a Wi-Fi network communication interface, and a Bluetooth Low Energy (BLE) network communication interface.

The field communication device 20 includes a field controller 21 and multiple field communication interfaces 22, wherein the field communication interfaces 22 are electrically connected to the field controller 21. The field controller 21 is a controller chip, and the field communication interfaces 22 are wireless communication interfaces. At least two of the field communication interfaces 22 correspond to at least two of the vehicle communication interfaces 12 in same types of communication protocols. As an example demonstrated in FIG. 3, the field communication interfaces 22 include a 5G mobile network communication interface, a C-V2X network communication interface, and a Wi-Fi network communication interface. In another embodiment, the vehicle communication interfaces 12 and the field communication interfaces 22 completely correspond to each other.

When the vehicle communication interfaces 12 and the field communication interfaces 22 corresponding to each other, the vehicle controller 11 is able to send connection commands to the field controller 21. As such, with reference to FIG. 1, multiple communication channels CH are established between at least two of the field communication interfaces 22 and at least two of the vehicle communication interfaces 12, allowing a network packet to be transferred between the vehicle controller 11 and the field controller 21 via the communication channels CH. With reference to FIG. 3, the multiple communication channels CH between the vehicle communication device 10 and the field communication device 20 include a 5G mobile network communication channel CH1, a C-V2X network communication channel CH2, and a Wi-Fi network communication channel CH3. The vehicle controller 11 and the field controller 21 may simultaneously use the 5G mobile network communication channel CH1, the C-V2X network communication channel CH2, and the Wi-Fi network communication channel CH3 for sending network packets. Furthermore, the vehicle controller 11 detects a real-time bandwidth and a real-time connection speed of each of the communication channels CH. The detection of the real-time bandwidth and the real-time connection speed is a conventional technique used in communication networks, and therefore hereby will be omitted from further descriptions.

Figure 4:
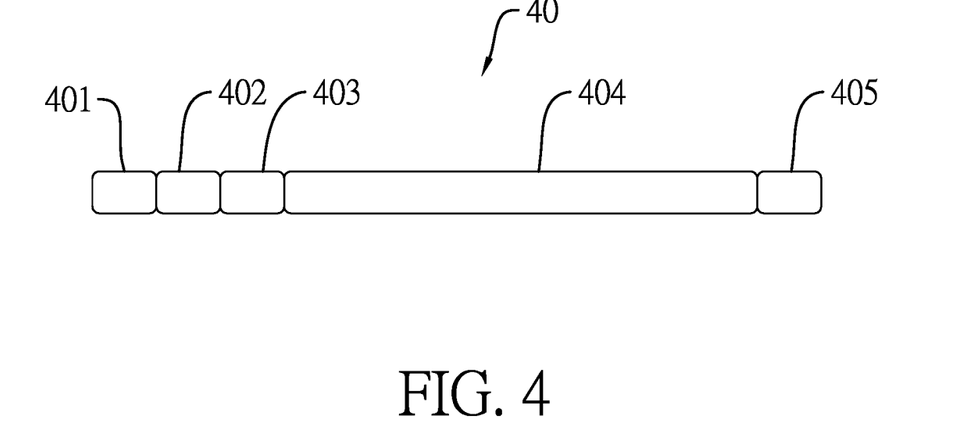
FIG. 4 is a schematic diagram of a network packet frame transmitted from a vehicle controller of the present invention.

With reference to FIG. 4, the vehicle controller 11 transmits a first network packet frame 40 to the field controller 21, and the first network packet frame 40 includes a starting character 401, a serial 402, a time code 403, a vehicle information 404, and an ending character 405. The vehicle controller 11 determines whether the first network packet frame 40 is complete by monitoring the starting character 401 and the ending character 405. The serial 402 and the time code 403 include transmitted time-sequence information of the first network packet frame 40. The vehicle information 404 includes information of a vehicle's identification (ID) number and the real-time traffic data aforementioned.

Figure 5:
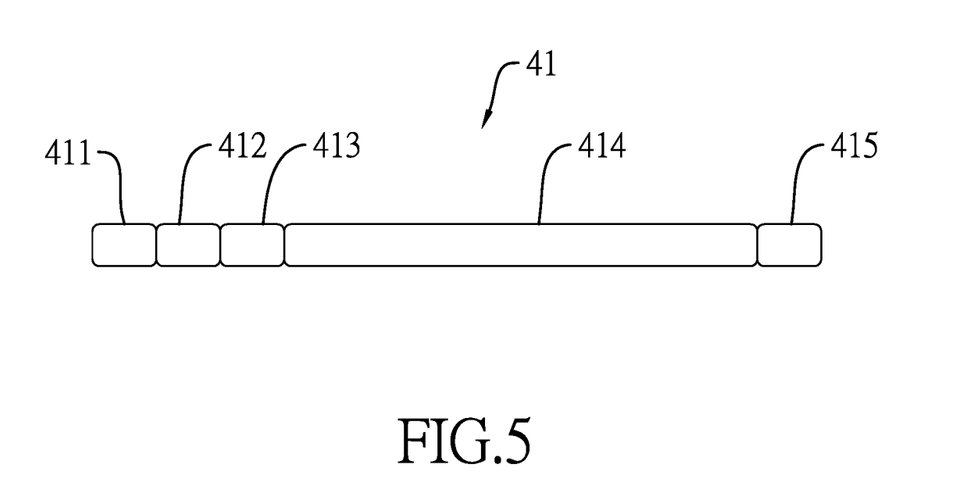
FIG. 5 is a schematic diagram of a network packet frame transmitted from a field controller of the present invention.

With reference to FIG. 5, the field controller 21 transmits a second network packet frame 41 to the vehicle controller 11, and the second network packet frame 41 includes a starting character 411, a serial 412, a time code 413, a field information 414, and an ending character 415 of the second network packet. The field controller 21 determines whether the second network packet frame 41 is complete by monitoring the starting character 411 and the ending character 415. The serial 412 and the time code 413 include transmitted time-sequence information of the second network packet frame 41. The field information 414 includes an ID number for a field area.

For the already established communication channels CH, the vehicle controller 11 defines a bandwidth level and a speed level based on the real-time bandwidth and the real-time connection speed of each of the communication channels CH. The bandwidth level and the speed level can respectively have data format of a numeric value, though both are free to have other types of data format. The smaller the bandwidth level of each of the communication channels CH is, the better bandwidth of each of the communication channels CH has. Similarly, the smaller the speed level of each of the communication channels CH is, the faster data transferring speed each of the communication channels CH has. The vehicle controller 11 further creates a score based on the bandwidth level and the speed level of each of the communication channels CH. The score is used to judge the communication quality between the vehicle communication device 10 and the field communication device 20. The score has format of a numeric value, though also free to have other types of data format. The smaller the score is for each of the communication channels CH, the better the communication quality each of the communication channels CH has.

The vehicle controller 11 sets one of the communication channels CH with the best score, i.e. one of the communication channels CH with established connection and with the smallest score, as a main communication channel. The vehicle controller 11 uses the main communication channel to transfer data bi-directionally with the field communication device 20. When the communication quality is relatively good, the real-time traffic data of the vehicle 100 would be effectively sent to the back-end information station 30, and the vehicle 100 would also be able to effectively receive data and control commands sent from the back-end information station 30.

The following details how the main communication channel is selected from multiple communication channels CH with established connections. Here the field controller 21 is able to send testing network packets to the vehicle controller 11 via the communication channels CH with already established connections.

With reference to FIG. 1, in the embodiment of the present invention, the vehicle controller 11 stores a bandwidth level conversion form 50 corresponding to each of the communication channels CH. The bandwidth level conversion form 50 includes multiple bandwidth ranges and multiple bandwidth level serials corresponding to the bandwidth ranges. For the communication channels CH with already established connections, the vehicle controller 11 determines which one of the bandwidth ranges the real-time bandwidth belongs to. The vehicle controller 11 then defines the bandwidth level to be the bandwidth level serial corresponding to the belonged bandwidth range. For example, the bandwidth level conversion form 50 for each of the communication channels CH is listed below. Each of the bandwidth ranges corresponds to one of the bandwidth level serials. The bandwidth level serials are represented in numbers. The smaller the numbers representing the bandwidth level serials are, the better the bandwidth performances are.

| Bandwidth Level Conversion Form | | |
|---|---|---|
| Bandwidth level | Bandwidth range (Mbps) | |
| serials | Upper limit | Bottom limit |
| 1 | $BW_0$ | $BW_1$ |
| 2 | $BW_1 - 1$ | $BW_2$ |
| . | . | . |
| . | . | . |
| . | . | . |
| N | $BW_{n-1} - 1$ | $BW_n$ |

Regarding the bandwidth level conversion form 50 shown above, $BW_0$ represents a reference bandwidth for each of the communication channels CH. When the testing network packets sent by the field controller 21 to the vehicle controller 11 via the communication channels CH, the field controller 21 already includes $BW_0$ in the testing network packets. When the vehicle controller 11 receives the testing network packets, the vehicle controller 11 would be able to obtain $BW_0$, so each channel of the communication channels CH is able to individually correspond to a $BW_0$. In the bandwidth level conversion form 50 shown above, N represents the biggest value corresponding to the bandwidth level serials, and N is also a positive integer bigger than or equal to two. In the bandwidth level conversion form 50 shown above, n represents the corresponding bandwidth level serial, and $BW_n$ is represented as below:

$$BW_n = BW_0 - (BW_0/N) \times n$$

For instance, when N=10 and $BW_0$=1000, $BW_1$ will equal 900. Therefore bandwidth level serial 1 would correspond to bandwidth range of 1000 to 900 Mbps, and bandwidth level serial 2 would correspond to bandwidth range of 899 to 800 Mbps and so forth. For bandwidth level serial N, N=n, and therefore a bottom limit of the corresponding bandwidth range will be zero. Logically, the best bandwidth range with the highest Mbps for high performance corresponds to bandwidth level serial 1.

In the embodiment of the present invention, and with reference to FIG. 1, the vehicle controller 11 stores a speed level conversion form 51 corresponding to each of the communication channels CH. The speed level conversion form 51 includes multiple connection speed ranges and multiple speed level serials corresponding to the connection speed ranges. For the communication channels CH with already established connections, the vehicle controller 11 is able to determine which one of the speed ranges the real-time connection speed belongs to. The vehicle controller 11 then defines the speed level to be the speed level serial corresponding to the belonged speed range. For example, the speed level conversion form 51 for each of the communication channels CH is listed below. Each of the connection speed ranges corresponds to one of the speed level serials. The speed level serials are represented in numbers. The smaller the numbers representing the speed level serials are, the better the connection speed performances are.

Speed Level Conversion Form

| Speed level serials | Connection speed range (bps) | |
|---|---|---|
| | Upper limit | Bottom limit |
| 1 | $SPD_0$ | $SPD_1$ |
| 2 | $SPD_1 - 1$ | $SPD_2$ |
| . | . | . |
| . | . | . |
| . | . | . |
| M | $SPD_{m-1} - 1$ | $SPD_m$ |

Regarding the speed level conversion form 51 shown above, $SPD_0$ represents a reference connection speed for each of the communication channels CH. When the testing network packets sent by the field controller 21 to the vehicle controller 11 via the communication channels CH, the field controller 21 already includes $SPD_0$ in the testing network packets. When the vehicle controller 11 receives the testing network packets, the vehicle controller 11 would be able to obtain $SPD_0$, so each channel of the communication channels CH is able to individually correspond to an $SPD_0$. In the speed level conversion form 51 shown above, M represents the biggest value corresponding to the speed level serials, M is also a positive integer bigger than or equal to two, and M can also be equal to N (though M is free to be elsewise). In the speed level conversion form 51 shown above, m represents the corresponding speed level serial, and $SPD_m$ is represented as below:

$$SPD_m = SPD_0 - (SPD_0/M) \times m$$

For instance, when M=10 and $SPD_0$=2000, $SPD_1$ will equal 1800. Therefore speed level serial 1 would correspond to connection speed range of 2000 to 1800 bps, and speed level serial 2 would correspond to connection speed range of 1799 to 1600 bps and so forth. For speed level serial M, M=m, and therefore a bottom limit of the corresponding connection speed range will be zero. Logically, the best connection speed range with the highest bps for high performance corresponds to speed level serial 1.

Regarding a calculation of the score for each of the communication channels CH, in the embodiment, the vehicle controller 11 stores multiple weighted values. Each of the weighted values differs from each other, and each of the weighted values corresponds to one of the communication channels CH. The weighted values are represented in numbers, though the weighted values are free to be represented in another format. The smaller the numbers representing weighted values are, the more likely the corresponding communication channel CH for the weighted value will be chosen for use. The vehicle controller 11 creates the score for each of the communication channels CH based on the corresponding bandwidth level, the corresponding speed level, and the corresponding weighted value. An equation of evaluation is shown below:

the score=(the bandwidth level+the speed level)×the weighted value

For example, the weighted values for each of the communication channels CH are listed below:

List 1

| Communication channel | Weighted value |
|---|---|
| 5G | 1 |
| 4G | 2 |
| C-V2X | 3 |
| Wi-Fi | 4 |
| BLE | 5 |

The following two scenarios detail how the vehicle controller 11 sets the main communication channel through multiple options of the communication channels CH.

Scenario 1:

The communication channels CH established by the vehicle communication device 10 and the field communication device 20 include a 5G mobile network communication channel, a 4G mobile network communication channel, a C-V2X network communication channel, a Wi-Fi network communication channel, and a BLE network communication channel. The vehicle controller 11 determines the scores based on the bandwidth levels, the speed levels, and the weighted values listed below:

List 2

| Communication channels | Bandwidth levels | Speed levels | Weighted values | Scores |
|---|---|---|---|---|
| 5G | 1 | 1 | 1 | 2 |
| 4G | 2 | 1 | 2 | 6 |
| C-V2X | 3 | 2 | 3 | 15 |
| Wi-Fi | 2 | 4 | 4 | 24 |
| BLE | 5 | 5 | 5 | 50 |

As detailed above in scenario 1, the vehicle controller 11 determines that the 5G mobile network communication channel has the smallest score. This means the 5G mobile network communication channel provides the best communication quality, and therefore the vehicle communication device 10 would set the 5G mobile network communication channel as the main communication channel to connect and to transfer data bi-directionally with the field communication device 20.

Scenario 2:

The communication channels CH established by the vehicle communication device 10 and the field communication device 20 include a 4G mobile network communication channel, a C-V2X network communication channel, and a Wi-Fi network communication channel. The vehicle controller 11 determines the scores based on the bandwidth levels, the speed levels, and the weighted values listed below:

List 3

| Communication channels | Bandwidth levels | Speed levels | Weighted values | Scores |
|---|---|---|---|---|
| 4G | 2 | 1 | 2 | 6 |
| C-V2X | 1 | 1 | 3 | 6 |
| Wi-Fi | 2 | 4 | 4 | 24 |

As detailed above in scenario 2, the vehicle controller 11 determines that the 4G mobile network communication channel and the C-V2X network communication channel both have the smallest score. This means the 4G mobile network communication channel and the C-V2X network communication channel both provide the best communication quality. Since the weighted value corresponding to the 4G mobile network communication channel is smaller than the weighted value corresponding to the C-V2X network communication channel, the vehicle controller 11 would set the 4G mobile network communication channel as the main communication channel to connect and to transfer data bi-directionally with the field communication device 20. In other words, when the vehicle controller 11 determines more than two of the communication channels CH share the best score, the vehicle controller 11 would set the communication channel corresponding to the best (smallest) weighted values, among the communication channels CH with the best score, as the main communication channel.

As described previously, the vehicle controller 11 would set the main communication channel from one of the communication channels CH to transfer data with the field communication device 20. However, the main communication channel is still prone to possibilities of network packet delivery abnormalities or disconnection. For instance, when the field communication interface 22 corresponding to the main communication channel fails, network packet delivery abnormalities or disconnection may occur. When the vehicle controller 11 determines abnormalities relating to network packet deliveries or a disconnection has occurred, the vehicle controller 11 would reset another one of the communication channels CH with established connections (and with the best score at the very instance) as the main communication channel. This method provides a salvage mechanism for when abnormalities or disconnections happen, thus maintaining data transfers between the vehicle controller 11 and the field communication device 20 at all times, and maintaining connections between the vehicle 100 and the back-end information station 30 at all times. As an example referring to scenario 1, when the main communication channel as the 5G mobile network communication channel occur disconnections or network packet delivery abnormalities, the vehicle controller 11 resets the 4G mobile network communication channel as the main communication channel. As the vehicle 100 drives more, perhaps the 5G mobile network communication channel would re-gain its connectivity. The vehicle controller 11 then re-sends a connection command to the field controller 21 to once again establish a connection with the 5G mobile network communication channel. When the 5G mobile network communication channel is re-connected and has once again been determined as having the best score, the vehicle controller 11 then resets again for the 5G mobile network communication channel to be the main communication channel. Same logical steps can be applied to scenario 2, wherein when the main communication channel as the 4G mobile network communication channel occur disconnections or network packet delivery abnormalities, the vehicle controller 11 resets the C-V2X network communication channel as the main communication channel.

Figure 6:
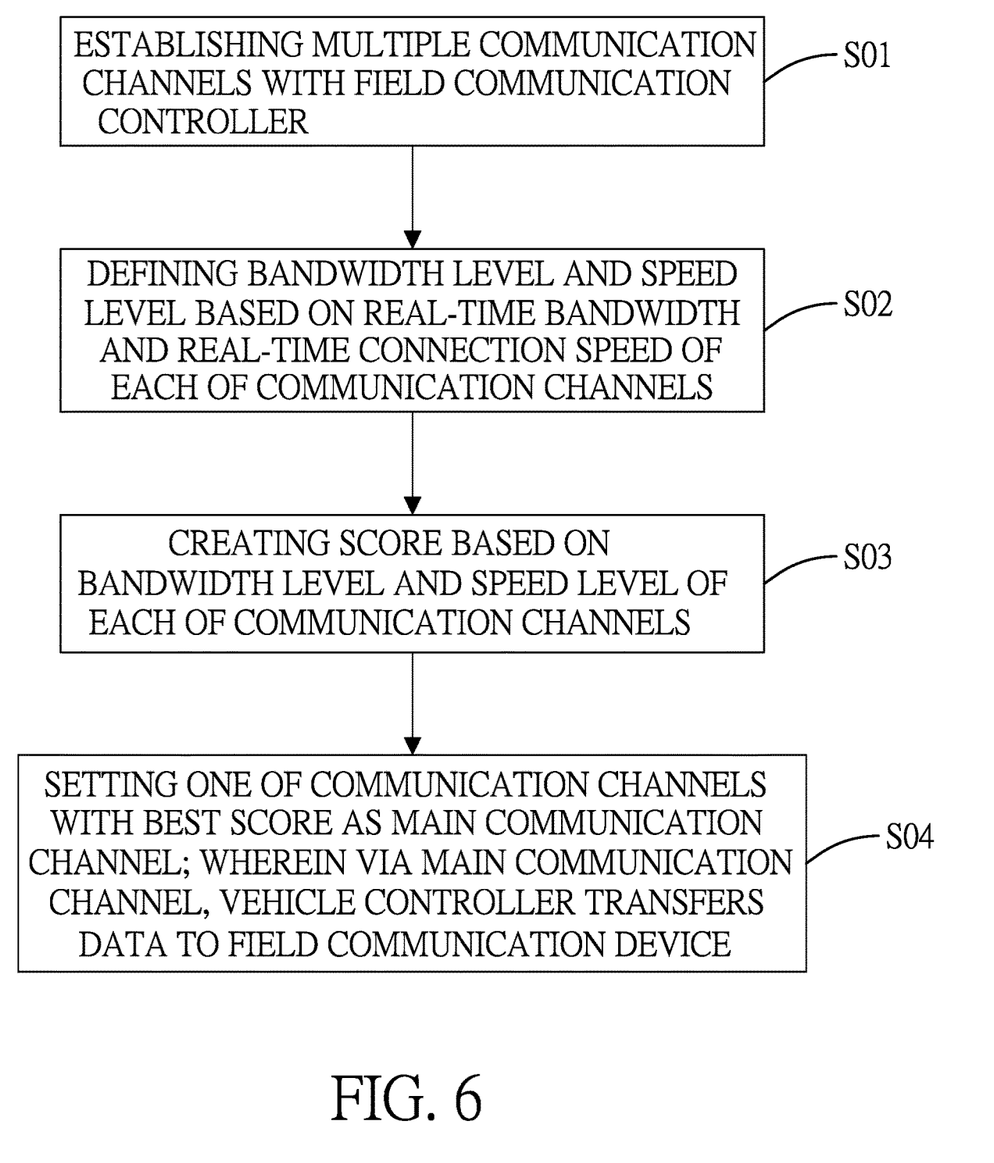
FIG. 6 is a flow chart of an embodiment of a vehicle hybrid communication method of the present invention.

With reference to FIG. 6, in conclusion, the vehicle hybrid communication method of the present invention is executed by the vehicle controller 11. The vehicle hybrid communication method includes the following steps:

Step S01: establishing multiple communication channels CH with the field communication controller 21;

Step S02: defining the bandwidth level and the speed level based on the real-time bandwidth and the real-time connection speed of each of the communication channels CH;

Step S03: creating the score based on the bandwidth level and the speed level of each of the communication channels CH; and Step S04: setting one of the communication channels CH with the best score as the main communication channel; wherein via the main communication channel, the vehicle controller 11 transfers data to the field communication device 20.

Figure 7:
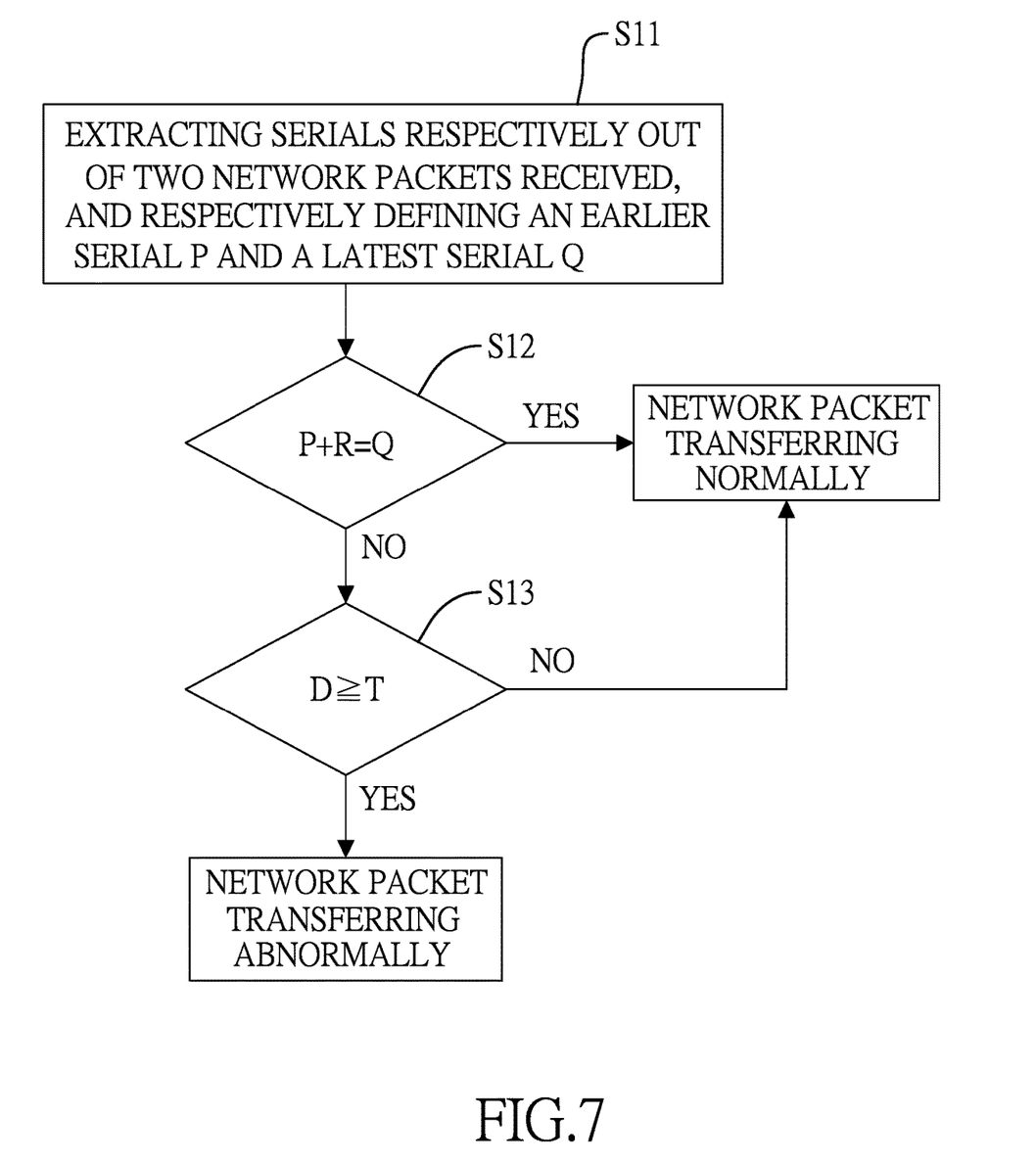
FIG. 7 is a flow chart of a determination of whether a main communication channel transfers a network packet abnormally in the present invention.

With reference to FIG. 7, the following steps detail how the vehicle controller 11 determines whether the main communication channel has encountered abnormalities relating to network packet transfers:

Step S11: extracting serials respectively from two network packets received by the vehicle controller 11 through the main communication channel, and respectively defining the serials that are extracted as an earlier serial P and a latest serial Q; wherein the vehicle controller 11 receives the earlier serial P first and receives the latest serial Q later;

Step S12: determining whether the main communication channel has encountered disconnection or abnormalities based on the network packet transfers according to the earlier serial P and the latest serial Q received by the vehicle controller 11; wherein the vehicle controller 11 determines whether the earlier serial P plus an accumulative coefficient R equals the latest serial Q, for determining whether there are discontinuities between the latest serial Q and the earlier serial P;

if the vehicle controller 11 determines the earlier serial P plus the accumulative coefficient R equals the latest serial Q, then the latest serial Q and the earlier serial P are viewed as being continuous, in other words, the network packet transfer is functioning normally; if the vehicle controller 11 determines elsewise, then further proceed to step S13;

Step S13: letting the latest serial Q minus the earlier serial P equal a difference D, and determining whether the difference D is greater than or equal to a tolerance value T;

if the difference D is smaller than the tolerance value T, then the vehicle controller 11 determines the main communication channel is normally connecting; if the difference D is greater than or equal to the tolerance value T, then the vehicle controller 11 determines that discontinuities exist between the latest serial Q and the earlier serial P, in other words, between the two received network packets, many other network packets are lost, and therefore data transferring abnormalities exist. The aforementioned accumulative coefficient R and the tolerance value T are adjustable default values. The accumulative coefficient R for instance can be set to one, and the tolerance value T can be set to five.

Figure 8:
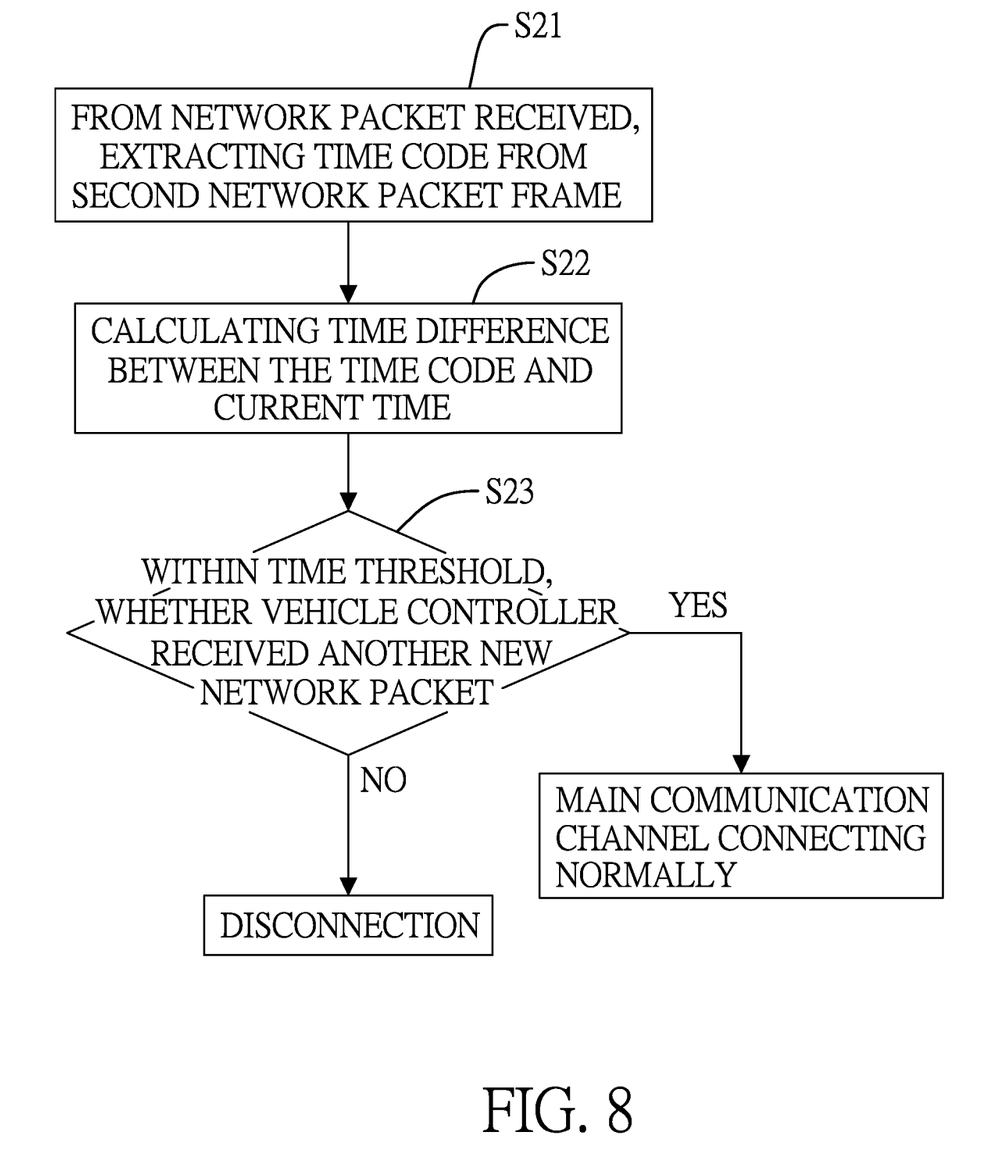
FIG. 8 is a perspective-viewed flow chart of a determination of whether a main communication channel has disconnected in the present invention.

With reference to FIG. 8, the following steps detail how the vehicle controller 11 determines whether the main communication channel has disconnected:

Step S21: extracting the time code 413 from the second network packet frame 41 from a network packet received by the vehicle controller 11 from the field controller 21; wherein the time code 413 details the time of the network packet sent from the field controller 21;

Step S22: calculating a time difference between the time code 413 and a current time; wherein the vehicle controller 11 is able to obtain the current time through the OBD-II, the CAN Bus, or the real-time traffic data of the vehicle 100;

Step S23: determining when the time difference is within a time threshold, in other words, when the time difference is less than or equal to the time threshold, whether the vehicle controller 11 has received another new network packet;

if yes, then the main communication channel is determined to be functioning normally without disconnections; elsewise, the vehicle controller 11 determines a timeout has occurred, meaning the main communication channel has encountered disconnection. The aforementioned time threshold is an adjustable default value. The time threshold can be set to be 100 milliseconds (ms).

In conclusion, multiple communication channels are established between the vehicle controller 11 and the field controller 21. The vehicle controller 11 is able to monitor communication qualities of each of the communication channels CH. The communication channels CH having the best communication qualities shall receive the best score, and one of the communication channels CH with the best score is set to be the main communication channel. On the other hand, the present invention also provides the salvage mechanism for when abnormalities or disconnections happen to the main communication channel. The present invention prepares another communication channel for substitution for the main communication channel when needed. In other words, when the main communication channel encounters abnormalities relating to data transfers or disconnections, the vehicle controller 11 will reset another communication channel as the main communication channel, to ensure best communication quality and to maintain connections between the vehicle communication device 10 and the field communication device 20.

What is claimed is:

1. A vehicle hybrid communication system, comprising:
    a vehicle communication device, mounted in a vehicle, and comprising a vehicle controller and multiple vehicle communication interfaces; wherein the vehicle communication interfaces are electrically connected to the vehicle controller; and
    a field communication device, mounted on a roadside, and comprising a field controller and multiple field communication interfaces; wherein the field communication interfaces are electrically connected to the field controller; wherein multiple communication channels are established between at least two of the field communication interfaces and at least two of the vehicle communication interfaces, allowing a network packet to be transferred between the vehicle communication device and the field communication device via the communication channels;
    wherein the vehicle controller respectively defines a bandwidth level and a speed level based on a real-time bandwidth and a real-time connection speed of each of the communication channels; wherein the vehicle controller then creates a score based on the bandwidth level and the speed level of each of the communication channels, and then the vehicle controller sets one of the communication channels with the best score as a main communication channel; wherein via the main communication channel, the vehicle controller transfers data to the field communication device.

2. The vehicle hybrid communication system as claimed in claim 1, wherein the vehicle controller stores a bandwidth level conversion form corresponding to each of the communication channels; wherein the bandwidth level conversion form comprises multiple bandwidth ranges and multiple bandwidth level serials corresponding to the bandwidth ranges;
    wherein the vehicle controller determines which one of the bandwidth ranges the real-time bandwidth belongs to, and then the vehicle controller defines the bandwidth level to be the bandwidth level serial corresponding to the belonged bandwidth range;
    wherein the vehicle controller further stores a speed level conversion form corresponding to each of the communication channels; wherein the speed level conversion form comprises multiple connection speed ranges and multiple speed level serials corresponding to the connection speed ranges; and
    wherein the vehicle controller determines which one of the speed ranges the real-time connection speed belongs to, and then the vehicle controller defines the speed level to be the speed level serial corresponding to the belonged speed range.

3. The vehicle hybrid communication system as claimed in claim 2, wherein
    the vehicle controller stores multiple weighted values, and each of the weighted values differs from each other; each of the weighted values corresponds to one of the communication channels; and
    the vehicle controller creates the score for each of the communication channels based on the corresponding bandwidth level, the corresponding speed level, and the corresponding weighted value.

4. The vehicle hybrid communication system as claimed in claim 3, wherein the vehicle controller creates the score for each of the communication channels based on an equation below:

$$\text{the score} = (\text{the bandwidth level} + \text{the speed level}) \times \text{the weighted value}.$$

5. The vehicle hybrid communication system as claimed in claim 4, wherein when the vehicle controller determines more than two of the communication channels share the best score, the vehicle controller sets the communication channel corresponding to the best weighted values, among the communication channels with the best score, as the main communication channel.

6. The vehicle hybrid communication system as claimed in claim 3, wherein when the vehicle controller determines the main communication channel has encountered disconnection or abnormalities relating to network packet transfers, the vehicle controller resets another one of the communication channels as the main communication channel.

7. The vehicle hybrid communication system as claimed in claim 2, wherein from each testing network packet received by the vehicle controller via each of the communication channels, the vehicle controller extracts a reference bandwidth and a reference connection speed for each of the communication channels; and
    wherein the vehicle controller further defines multiple bandwidth ranges according to the reference bandwidth for each of the communication channels and the bandwidth level serials; and the vehicle controller further defines multiple connection speed ranges according to the reference connection speed for each of the communication channels and the speed level serials.

8. The vehicle hybrid communication system as claimed in claim 2, wherein when the vehicle controller determines the main communication channel has encountered disconnection or abnormalities relating to network packet transfers, the vehicle controller resets another one of the communication channels as the main communication channel.

9. The vehicle hybrid communication system as claimed in claim 1, wherein
    the vehicle controller stores multiple weighted values, and each of the weighted values differs from each other; each of the weighted values corresponds to one of the communication channels; and
    the vehicle controller creates the score for each of the communication channels based on the corresponding bandwidth level, the corresponding speed level, and the corresponding weighted value.

10. The vehicle hybrid communication system as claimed in claim 9, wherein the vehicle controller creates the score for each of the communication channels based on an equation below:

the score=(the bandwidth level+the speed level)×the weighted value.

11. The vehicle hybrid communication system as claimed in claim 10, wherein when the vehicle controller determines more than two of the communication channels share the best score, the vehicle controller sets the communication channel corresponding to the best weighted values, among the communication channels with the best score, as the main communication channel.

12. The vehicle hybrid communication system as claimed in claim 9, wherein when the vehicle controller determines the main communication channel has encountered disconnection or abnormalities relating to network packet transfers, the vehicle controller resets another one of the communication channels as the main communication channel.

13. The vehicle hybrid communication system as claimed in claim 1, wherein when the vehicle controller determines the main communication channel has encountered disconnection or abnormalities relating to network packet transfers, the vehicle controller resets another one of the communication channels as the main communication channel.

14. The vehicle hybrid communication system as claimed in claim 1, wherein the vehicle controller transmits a first network packet frame to the field controller, and the first network packet frame comprises a starting character, a serial, a time code, a vehicle information, and an ending character of the first network packet frame; and wherein the field controller transmits a second network packet frame to the vehicle controller, and the second network packet frame comprises a starting character, a serial, a time code, a field information, and an ending character of the second network packet.

15. A vehicle hybrid communication method, executed by a vehicle controller, comprising steps of:

establishing multiple communication channels with a field communication controller;

defining a bandwidth level and a speed level based on a real-time bandwidth and a real-time connection speed of each of the communication channels;

creating a score based on the bandwidth level and the speed level of each of the communication channels; and setting one of the communication channels with the best score as a main communication channel; wherein via the main communication channel, the vehicle controller transfers data to the field communication device.

16. The vehicle hybrid communication method as claimed in claim 15, wherein the vehicle controller determines which one of multiple bandwidth ranges the real-time bandwidth belongs to, and then the vehicle controller defines the bandwidth level to be a bandwidth level serial corresponding to the belonged bandwidth range; and the vehicle controller determines which one of multiple speed ranges the real-time connection speed belongs to, and then the vehicle controller defines the speed level to be a speed level serial corresponding to the belonged speed range.

17. The vehicle hybrid communication method as claimed in claim 16, wherein the vehicle controller creates the score for each of the communication channels based on an equation below:

the score=(the bandwidth level+the speed level)×a weighted value.

18. The vehicle hybrid communication method as claimed in claim 17, wherein when the vehicle controller determines more than two of the communication channels share the best score, the vehicle controller sets the communication channel corresponding to the best weighted values, among the communication channels with the best score, as the main communication channel.

19. The vehicle hybrid communication method as claimed in claim 16, wherein from each testing network packet received by the vehicle controller via each of the communication channels, the vehicle controller extracts a reference bandwidth and a reference connection speed for each of the communication channels;

wherein the vehicle controller further defines multiple bandwidth ranges according to the reference bandwidth for each of the communication channels and the bandwidth level serials; and the vehicle controller further defines multiple connection speed ranges according to the reference connection speed for each of the communication channels and the speed level serials.

20. The vehicle hybrid communication method as claimed in claim 15, wherein the vehicle controller creates the score for each of the communication channels based on an equation below:

the score=(the bandwidth level+the speed level)×a weighted value.

21. The vehicle hybrid communication method as claimed in claim 20, wherein when the vehicle controller determines more than two of the communication channels share the best score, the vehicle controller sets the communication channel corresponding to the best weighted values, among the communication channels with the best score, as the main communication channel.

22. The vehicle hybrid communication method as claimed in claim 15, wherein when the vehicle controller determines the main communication channel has encountered abnormalities relating to network packet transfers, the vehicle controller resets another one of the communication channels as the main communication channel;

wherein the vehicle controller extracts serials respectively from two network packets received by the vehicle controller through the main communication channel, and the serials extracted are respectively defined as an earlier serial and a latest serial; wherein the vehicle controller receives the earlier serial first and receives the latest serial later;

wherein the vehicle controller determines whether the earlier serial and the latest serial received by the vehicle controller are continuous; if discontinuous, the vehicle controller determines whether a difference of the latest serial and the earlier serial is greater than or equal to a tolerance value;

wherein if the difference is greater than or equal to the tolerance value, then abnormalities relating to data transfers are determined to exist in the main communication channel by the vehicle controller.

23. The vehicle hybrid communication method as claimed in claim 15, wherein when the vehicle controller determines the main communication channel has disconnected, the vehicle controller resets another one of the communication channels as the main communication channel;

wherein when the vehicle controller receives a network packet from the field controller, the vehicle controller extracts a time code from a second network packet frame of the network packet; wherein the time code details the time when the network packet is sent from the field controller; and  wherein the vehicle controller further determines when the time difference is within a time threshold, whether the vehicle controller receives another new network packet from the main communication channel; if the vehicle controller is yet to receive another new network packet from the main communication channel, then the main communication channel is determined by the vehicle controller to have disconnected.

\* \* \* \* \*